United States Patent [19]

Blaushild et al.

[11] Patent Number: 4,574,070
[45] Date of Patent: Mar. 4, 1986

[54] THERMAL INSULATION OF NUCLEAR REACTOR

[75] Inventors: Ronald M. Blaushild, Penn Hills; Richard E. Tome, Murrysville, both of Pa.

[73] Assignee: Westinghouse Electric Corp., Pittsburgh, Pa.

[21] Appl. No.: 510,490

[22] Filed: Jul. 5, 1983

[51] Int. Cl.⁴ ............................................. G21C 11/08
[52] U.S. Cl. ............................... 376/289; 376/260; 376/287
[58] Field of Search ............... 376/260, 262, 263, 287, 376/289; 52/248; 220/449, 452

[56] References Cited

U.S. PATENT DOCUMENTS

| | | | |
|---|---|---|---|
| 280,470 | 7/1883 | Hayes | 220/452 |
| 669,767 | 3/1901 | Schlichter . | |
| 1,021,718 | 3/1912 | Graft . | |
| 1,102,201 | 6/1914 | Nafziger . | |
| 1,232,604 | 7/1917 | Quick | 52/248 |
| 1,246,872 | 11/1917 | Caddell | 52/248 |
| 1,558,801 | 10/1925 | Frey | 52/248 |
| 2,746,578 | 5/1956 | Blomeley | 220/452 |
| 2,806,820 | 9/1957 | Wigner . | |
| 2,807,727 | 9/1957 | Fermi et al. | 376/287 |
| 2,932,745 | 4/1960 | Alberti et al. | 376/287 |
| 3,159,550 | 12/1964 | Laming . | |
| 3,413,196 | 11/1968 | Fortescue et al. . | |
| 3,540,615 | 11/1970 | Paine | 220/452 |
| 3,836,429 | 9/1974 | Frisch et al. . | |
| 3,963,936 | 6/1976 | Lowe | 376/287 |
| 4,174,596 | 11/1979 | Deibele . | |
| 4,303,553 | 12/1981 | Aoki et al. | 376/289 |
| 4,432,932 | 2/1984 | Jacobson | 376/260 |

FOREIGN PATENT DOCUMENTS 0034094  8/1981  European Pat. Off. ............ 376/260

*Primary Examiner*—Deborah L. Kyle
*Assistant Examiner*—Richard W. Wendtland
*Attorney, Agent, or Firm*—Daniel C. Abeles

[57] ABSTRACT

A nuclear reactor having a remotely removeable and replaceable thermal and/or radiation insulating shield for the head. This shield is formed of interlocked integrated shielding units of thermal insulating material. Each unit has a vertical member and a horizontal member. Each unit has a lifting-and-lowering rod on its top and it may be raised vertically by a remotely operable clamp engaging the head. The interlocking surfaces of adjacent units are so formed that when any unit is raised or lowered vertically its interlocking surface readily slides along the interlocking surfaces of the units adjacent to it with which it is interlocked.

14 Claims, 10 Drawing Figures

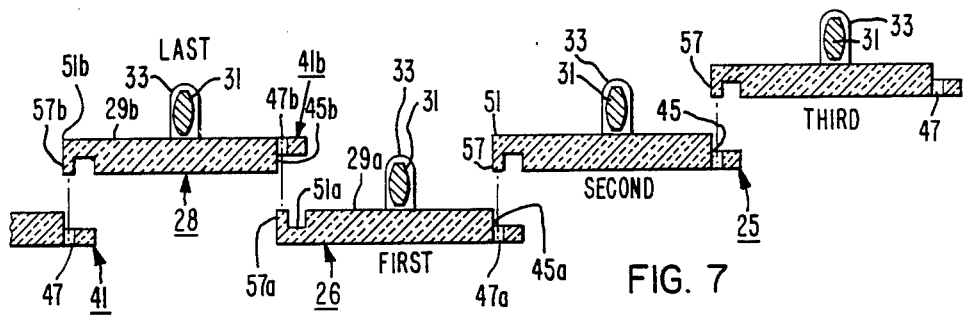
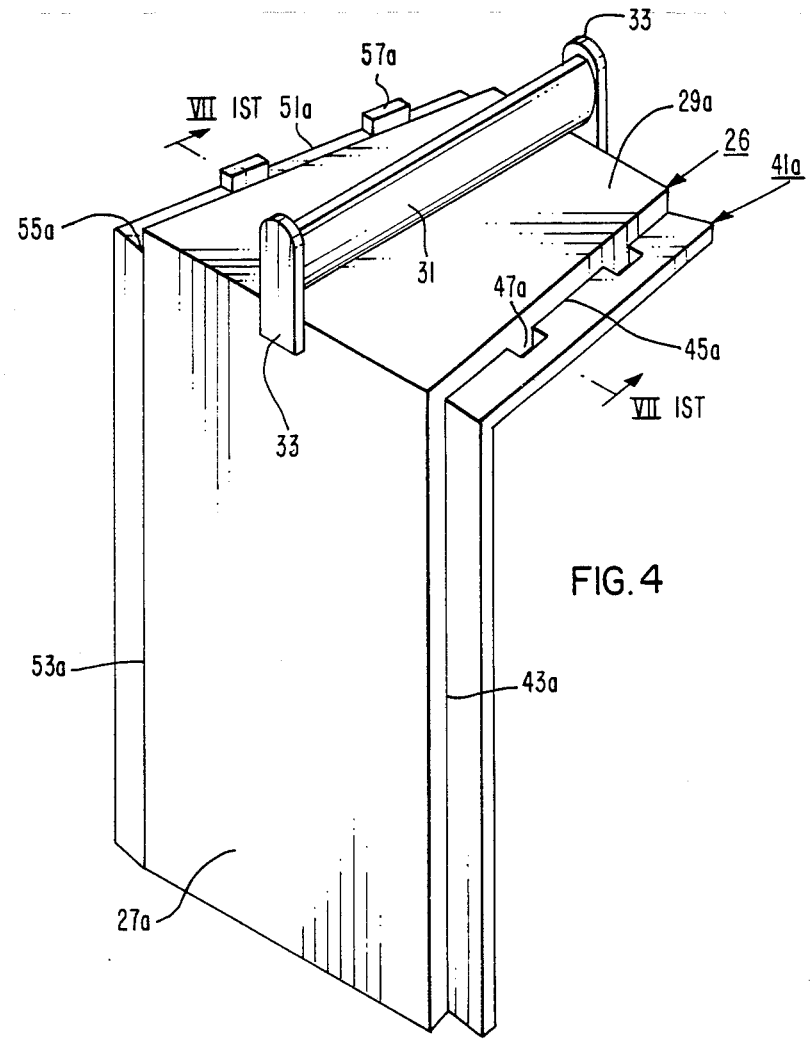

4,574,070

THERMAL INSULATION OF NUCLEAR REACTOR

CROSS-REFERENCE TO RELATED APPLICATION

Application Ser. No. 510,491, filed concurrently herewith to Ronald M. Blaushild et al. for "Thermal Insulation of Nuclear Reactor" and assigned to Westinghouse Electric Corporation is incorporated herein by reference.

BACKGROUND OF THE INVENTION

This invention relates to nuclear reactors and has particular relationship to thermal insulating shielding of such reactors. A nuclear reactor includes a vessel, which in the case of a pressurized water reactor, is a pressure-tight pressure vessel. The vessel includes a generally circular cylindrical body and a dome-shaped head. To conserve the thermal energy generated in the reactor it is desirable that the vessel be thermally shielded. In accordance with the teachings of the prior art, thermal insulating panels are bolted or buckled to the head of the reactor. The panels must be bolted or buckled to the head when the insulation is installed and unbolted or unbuckled from the head when the insulation is removed to afford access for removal of the head. The bolting and unbolting or the buckling and unbuckling are performed manually. In addition, the panels are typically provided with lifting eyes and it is necessary that when removing or installing the panels that the hook of the lift rig be attached to, or removed from, the eyes manually. When panels are being installed on the head or being prepared for removal from the head, personnel will be exposed to radiation. The installation or removal of the panels from the head is also time consuming which not only involves substantial labor cost but also exacerbates the exposure to radiation of the personnel involved. Since personnel can be exposed to radiation during only a limited time interval, the number of persons who must take part in a thermal panel installation or removal opertion is high and the resulting labor cost is high. An additional cost factor results from the requirement that personnel once exposed to radiation must avoid later exposure for several months.

It is an object of this invention to overcome the above-described drawbacks and disadvantages of the prior art and to provide a nuclear reactor having thermal insulation for the head which shall be readily installed or removed in a relatively short time by remote operation avoiding exposure of the installing or removing personnel to radiation.

SUMMARY OF THE INVENTION

In accordance with this invention there is provided a nuclear reactor having a thermal insulating shield for the head which includes a plurality of removable integrated shielding units or panels of thermal insulating material. Each unit includes a generally horizontal member and a generally vertical member which are rigidly joined. The edges of the horizontal and vertical members are formed so that adjacent units are interlocked. An effective closed thermal insulating shield is thus formed. Each shielding unit is provided with means, typically a lifting bar, for vertically raising the unit from its shielding position or lowering it to its shielding position. The mating or interlocked edges of the vertical members of the units are so formed that when a unit is raised or lowered the edges of its vertical member readily slide along the mating or interlocked edges of the adjacent unit or units. The shielding units are raised or lowered by long-handled tools carrying clamps at their lower ends. The clamps may be actuated remotely to engage or disengage raising-or-lowering means.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which:

FIG. 4 is a fragmental view in isometric showing the first of the shielding units to be positioned over the head of the reactor when the shielding units are positioned one-by-one in sequence in shielding position and the last to be removed when the shielding units are removed one-by-one;

FIG. 7 is an exploded fragmental view of the tops of the shielding units with the first unit shown in longitudinal section taken along line VII 1st-VII 1st of FIG. 4 and the other units shown in similar longitudinal section;

DETAILED DESCRIPTION OF THE PREFERRED EMBODIMENT

Figure 1:
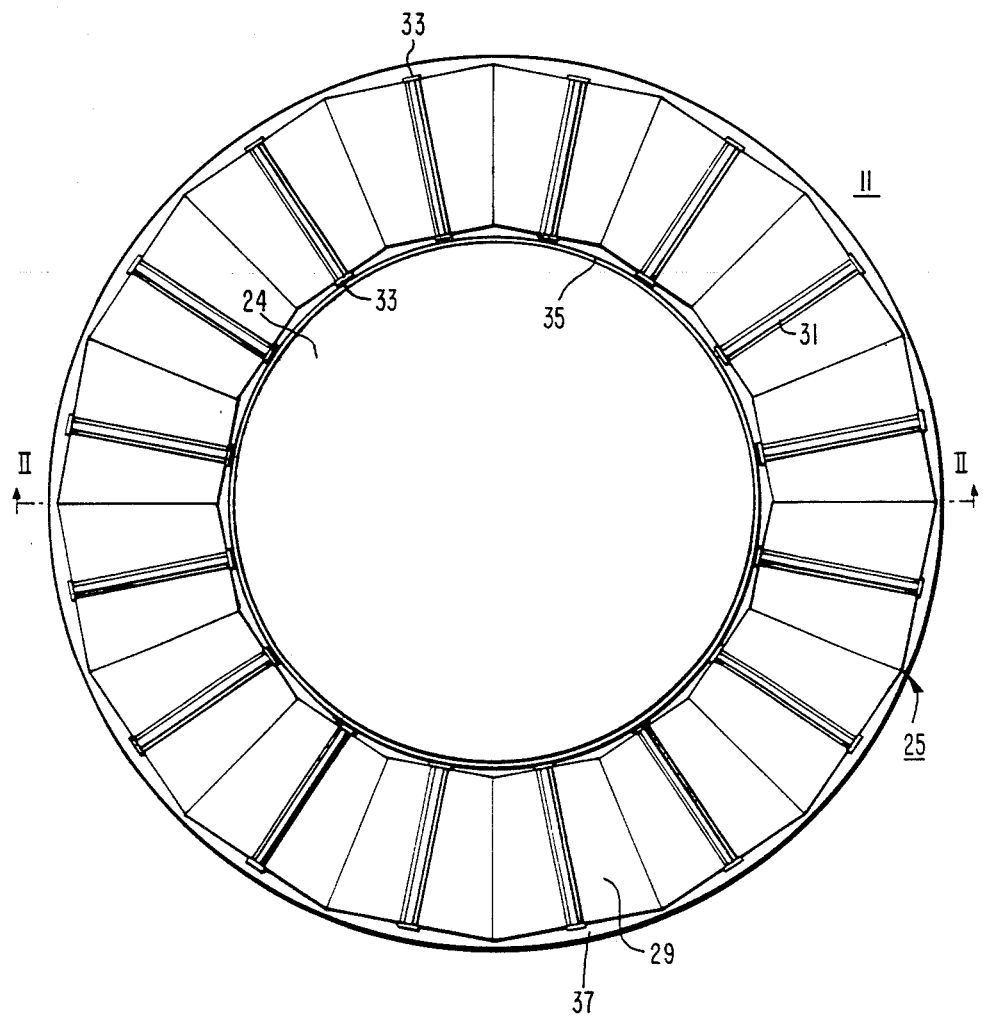
FIG. 1 is a plan view taken in the direction I of FIG. 2 of a nuclear reactor in accordance with this invention.

The nuclear reactor shown in FIGS. 1 through 10 includes a vessel 11 having a generally circularly cylindrical body 13 terminating in a semi-spherical bowl. The body 13 is closed at the top by a removable dome-shaped head 15 having a flange 17. Flange 17 engages the top edge of body 13 when the vessel is closed. The head 15 is secured to the body 13 by studs 19 which pass through the flange 17 and are screwed into the top edge. The joint between the flange 17 and body 13 includes an O-ring (not shown) resistant to the heat developed by reactor 11. To remove the head 15 the studs 19 are unscrewed and the head is raised usually by a crane (not shown).

The body 13 of reactor 11 is enclosed in a thermal insulating shield 21. The top 22 of the head 15 is enclosed in a shield 24 which is removeable with the head and need not be removed to afford access to remove the head. The lower portion of the head 15, where it is not pentrated by control rod guides and the like, is closed by a heat shield 23. Heat shield 23 constitutes an important feature of this invention. The shields 21, 23 and 24 could be composed of a material such as RICORAD Neutron Shielding sold by Richardson, Battery Parts Division, Melrose Park, Ill. 60160. In this case, the shields would reflect neutrons as well as serving as a thermal insulating material. The shielding can also be purely neutron reflecting and not necessarily thermal insulating.

Heat shield 23 includes a plurality of removable integrated heat shield units including a first-to-be installed and last-to-be-removed unit 26 (FIGS. 4, 7), intermediate units 25, and a last-to-be-installed and first-to-be-removed unit 28 (FIG. 7). Each intermediate unit 25 (FIG. 3) includes a generally vertical member 27 and a generally horizontal member 29 which is rigidly joined to the horizontal member. The first unit 26 includes a vertical member 27a and a horizontal member 29a rigidly connected to the vertical member. The last unit 26 includes a vertical member (not shown) and a horizontal member 29b. A rod 31 for lifting or lowering each shielding unit is supported between studs 33 extending generally centrally above each horizontal member 29, 29a, 29b, one stud extending from the inner edges of the members on one side and near the top of the vertical members 27, 27a, 27b on the opposite side. The thermal insulating or heat shield 23 is supported by an annular angle bracket 35 (FIG. 2) secured to the head 15 and by a flange 37 extending near the top of body 13. The inner end of each horizontal member 29, 29a, 29b engages the bracket 35 and the bottom of each vertical member 27, 27a, 27b engages the flange 37.

The edges of each thermal shield unit 26, 25, 28 are formed so that each unit interlocks with adjacent units. A projection 41 extends integrally from the inner end of the surfaces of the vertical member 27 and horizontal member 29 of each unit 25 along one edge. The vertical leg and the horizontal leg of the projection 41 of unit 25 each defines a right-angle groove 43 and 45 with the surface from which is extends. The horizontal projection has spaced slots 47. A projection 51 (FIG. 5) extends integrally from the outer ends of the vertical and horizontal members 27 and 29 of the opposite edge of each shielding unit 25. The vertical leg of projection 51 forms a right angle groove 53 with the surface from which it projects and the horizontal leg of projection 51 also forms a right angle groove 55 with the surface from which it projects. Spaced pins or studs 57 project downwardly from the horizontal leg of projection 51.

The first-to-be-positioned shielding unit 26 (FIG. 4) also has an integral projection 41a on one side which extends from the inner ends of the vertical member 25a and the horizontal member 27a. The vertical and horizontal legs of projection 41a each define a right-angle groove 43a and 45a with the surface from which it extends. There are spaced slots 47a in the horizontal leg of the projection. A projection 51a also extends integrally from the inner ends of the vertical and horizontal members on the opposite side of shielding unit 26. The horizontal and vertical legs of this projection 51a also each define a right-angle groove 53a and 55a with the surface from which the projection 51a extends. Spaced pins or studs 57a extend upwardly from the horizontal leg of projection 51a. The first-to-be-positioned or last-to-be-removed shielding unit 26 differs from the intermediate unit 25 in that its pin 57a projects upwardly while the pins 57 of the unit 25 project downwardly (FIG. 57).

A projection 41b (FIG. 7) also extends integrally from the outer ends of the vertical member (not shown) and horizontal member 29b on one side of the last-to-be-positioned or first-to-be-removed shielding unit 28. This projection defines a horizontal right-angle groove 45b and a vertical groove (not shown) with the surface from which it extends. There are inner spaced slots 47b in the horizontal leg of this projection. A projection 51b also extends integrally from the outer ends of the vertical member (not shown) and horizontal member 29b of the last-to-be-positioned and first-to-be-removed shielding unit 28. The vertical leg (not shown) of projection 51b forms a right-angle groove (not shown) with the surface of the vertical member from which it extends. The horizontal leg of the projection 51b forms a groove (not shown) with the surface of the horizontal member from which it extends. Spaced pins 57b project downwardly from the horizontal leg of projection 51b.

When the thermal insulating shield 23 is in shielding position, the projection 41 on one side of each intermediate shield unit 25 (referred to herein as the control intermediate unit) interlocks and mates with the projection 51 of an adjacent intermediate unit 25, if any, or on one side of projection 51b of the last unit 28, if any, and the projection 51 on the opposite side mates with the projection 41, of an adjacent intermediate unit (if any) or with projection 41a of the first unit 26, if any, on the oppoiste side. On the one side the grooves 43 and 45 of the central intermediate shield unit mate with the grooves 53 and 55 of the adjacent intermediate unit or 53b and 55b of the last unit and the pins 57 of the adjacent intermediate unit enter into and engage the slots 47 of the central intermediate unit. On the opposte side the grooves 43 and 45 of the central unit mate with the grooves 53 and 55, or the groove (not shown) and 55b of the adjacent unit, the pins 57 of the adjacent unit enters into the slots 47 of the central intermediate unit or the pins 57b of the last unit enter into slots 47 of the central intermediate unit. enter into and engage the slots in the central unit.

The shield units 26, 25, 28 are lowered into shielding position and raised from this position by a tool 61 (FIGS. 6, 8) which has a long handle 63 capable of extending from the units 26, 25, 28 to the seismic platform (not shown) or to the platform (not shown) above the well (not shown) in which the reactor 11 is disposed. A clamping unit 65 is secured to the lower end of the handle. The clamping unit includes a bar 67 connected at its center, or integral at its center, with the lower end of handle 63. Near each of its ends the bar 67 carries a bifurcated member 68 whose arms form opposite parts of a cam 69 and opposite jaws 73 of the clamp 65. Each cam 69 is of generally elliptical or oval shape open at the bottom where the parts are separated. The parts of the cam 69 terminate in flat plate 71 from the lower end of each of which the jaws 73 extend. The bifurcated member 68 is composed of resilient sheet metal, typically stainless steel.

Figure 6:
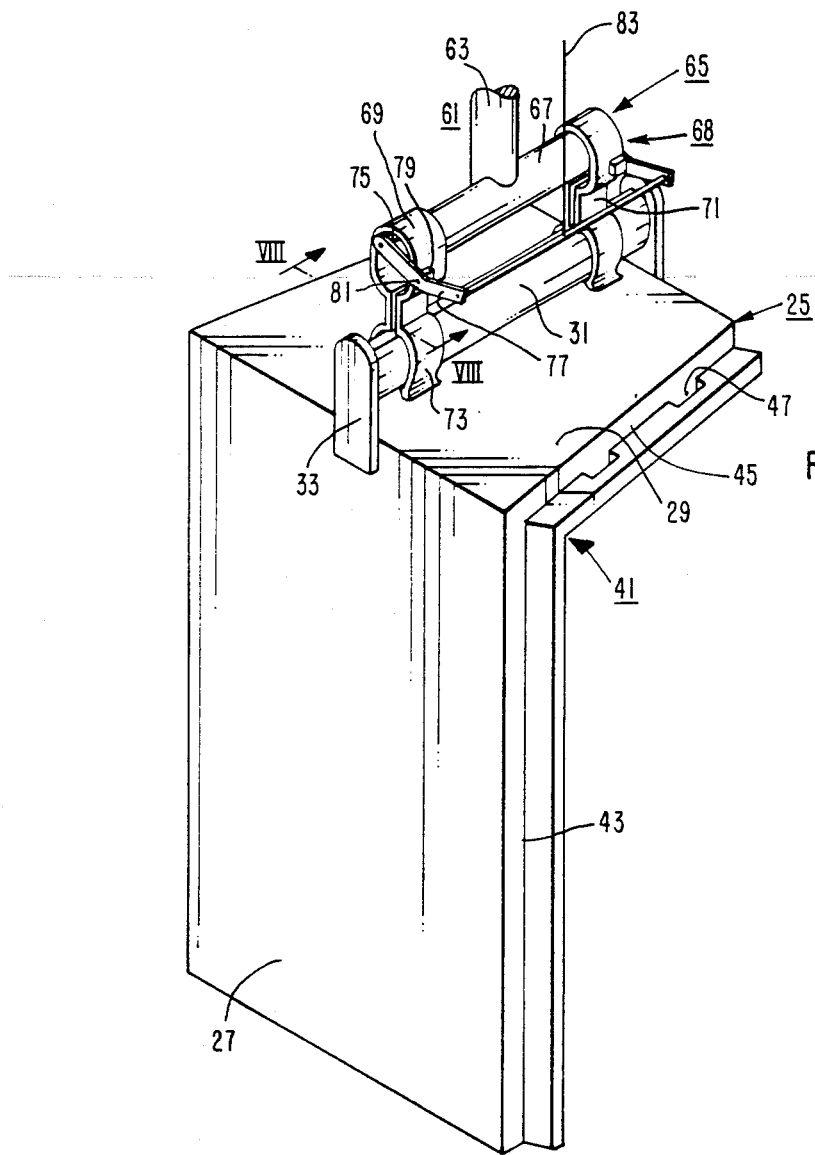
FIG. 6 is a fragmental view in isometric showing a shielding unit engaged by the lifting tool.
Figure 8:
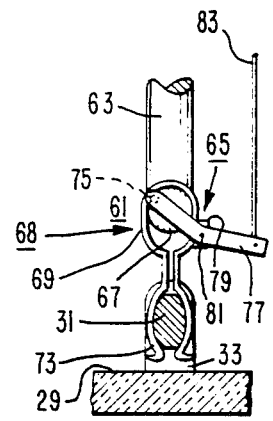
FIG. 8 is a fragmental view in section taken along line VIII—VIII of FIG. 6.

A cam follower 75 (FIG. 8) supported near the end of one arm of a bell lever 77 is cooperative with the cam 69. The lever 77 is pivotally suspended by a pin 81, at its center from a stud 79 secured to the cam 69 on one side. The lever 77 may be pivoted about the pin 81 by a cable 83 (FIG. 8) operable from the same platform as the handle 63. The clamping unit 65 is shown in FIGS. 6 and 8 with the clamping jaws 75 in engagement with the bar 31. To disengage the jaws 75 the cable 83 is pulled upwardly pivoting the lever 77 in clockwise direction as seen from the left of FIG. 6.

Figure 2:
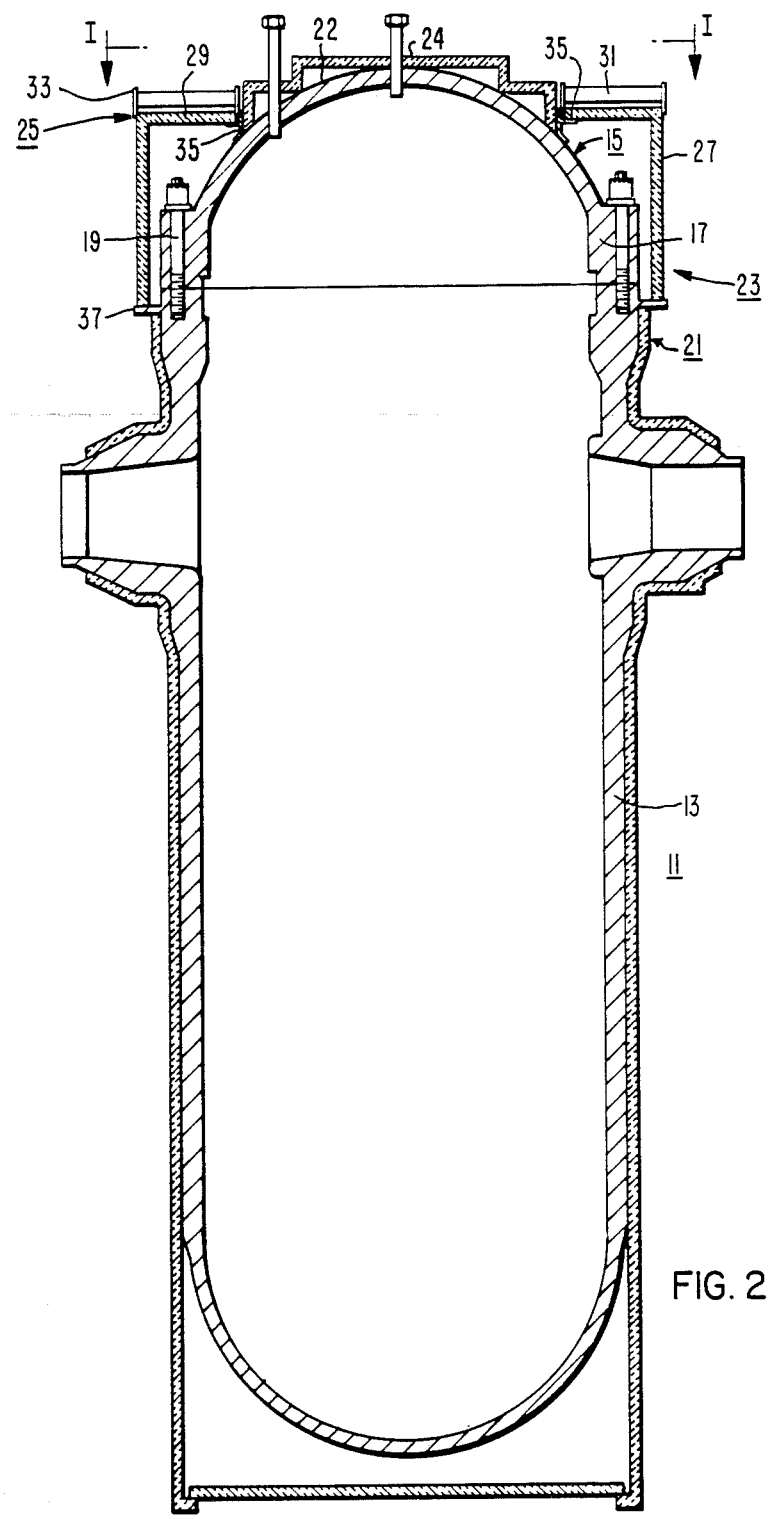
FIG. 2 is a longitudinal view in section taken along line II—II of FIG. 1.
Figure 3:
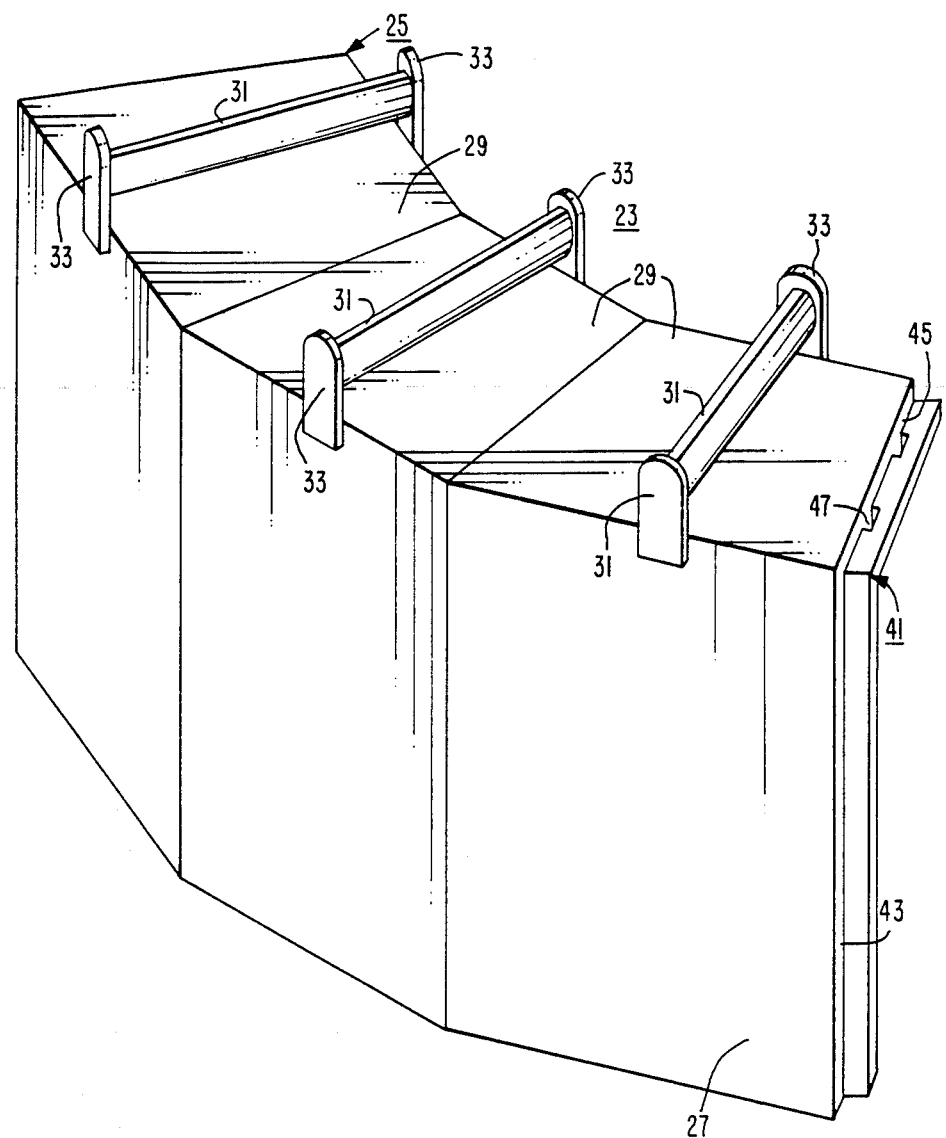
FIG. 3 is a fragmental view in isometric showing a plurality of thermal insulating shielding units interlocked in shielding position.
Figure 5:
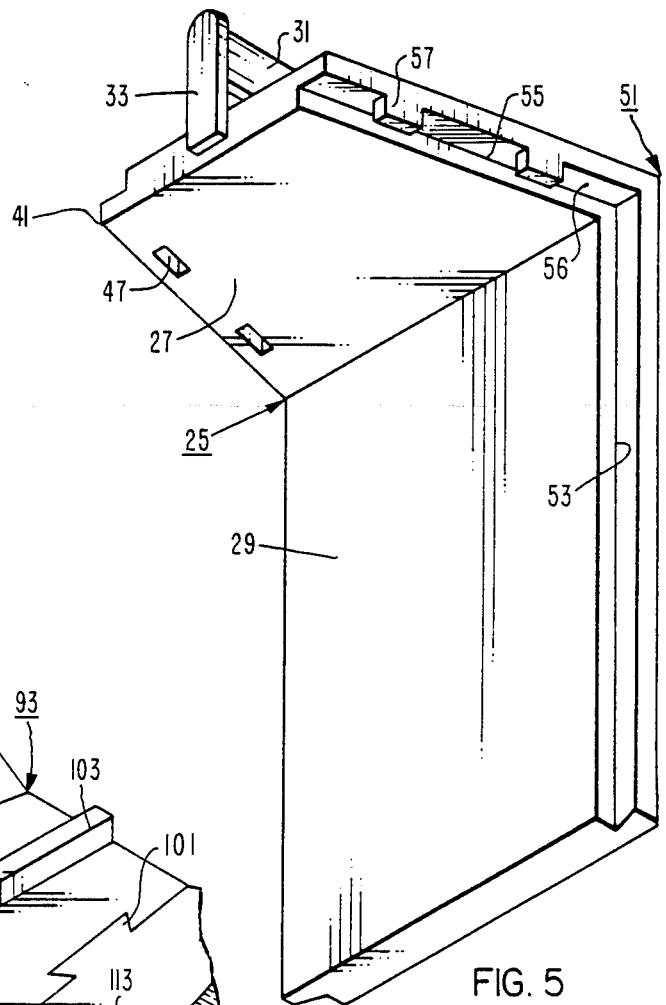
FIG. 5 is a fragmental view in perspective of an intermediate shielding unit between the first and the last unit to be removed, showing its mating edges from the inside.

The tool 61 may be carried and operated by a crane (not shown) which may be remotely controlled. The cable 83 may also be remotely controlled. When the thermal shield 23 is to be placed over the head 15, the tool 61, is remotely manipulated to engage the lifting bar 31 of the first shielding unit 26 (FIG. 7) in its clamping unit 65 and the unit 26 is positioned on the bracket 35 and the flange 37 (FIG. 2). A long-handled tool (not shown) may be provided for guiding the tool 61 and the shielding unit 26. Following the positioning of unit 26, the intermediate units 25, labeled 2nd, 3rd, etc. to nth in FIG. 7 are positioned in sequence counterclockwise as viewed from above FIG. 1. After positioning unit 26, the tool 61 is disengaged from its lifting-and-lowering bar 31 and engaged with bar 31 of the intermediate unit 25 which is labeled "2nd" (FIG. 7). This intermediate unit 25 is positioned adjacent to the first unit 26 and interlocked with unit 26. The surfaces of groove 53 of unit 25 are slid along the surfaces of groove 43a of unit 26 and pins 57 of unit 25 are engaged with the slots 47a of unit 26. The outer surface of horizontal member 29 of unit 25 is flush with the outer surface of member 29a of unit 26. Thereafter tool 61 is disengaged from the lifting-and-lowering bar 31 of second unit 25 and engaging with bar 31 of third unit 25. The third unit is interlocked with the second unit, the pins 57 of the third unit engaging the slots 47 of the second unit. This procedure continues until the nth unit 25 is interlocked with the (n−1)st unit 25 (the last in the series of intermediate units). The outer surfaces of the horizontal members 29 of all intermediate units are flush as shown in FIG. 3. Finally the last unit 28 (FIG. 7) is interlocked with the nth intermediate unit 25 and the first unit 26. The fingers 57b of unit 28 engage the slots 47 of the nth unit and the slots 47b engage the upwardly projecting pins 57a of the first unit 26. The outer surface of the horizontal member 29b is flush with the outer surfaces 29a and 29 of the other units. The thermal shield 23 is in thermally-insulating shielding position.

In removing the shield 23, the shielding units 26, 25, 28 are raised by tool 61 in the reverse order; i.e., clockwise as seen from above FIG. 1. First the last unit 28 (FIG. 7) is raised. The surfaces defining groove 55b and 45b are slid along grooves 45 and 55a of the adjacent units 25 and 24, pins 57b are disengaged from slots 47 and slots 47b are disengaged from pins 57a. The other units 25 are then raised in the sequence nth, (n−1)th . . . 2nd, 1st.

Figure 9:
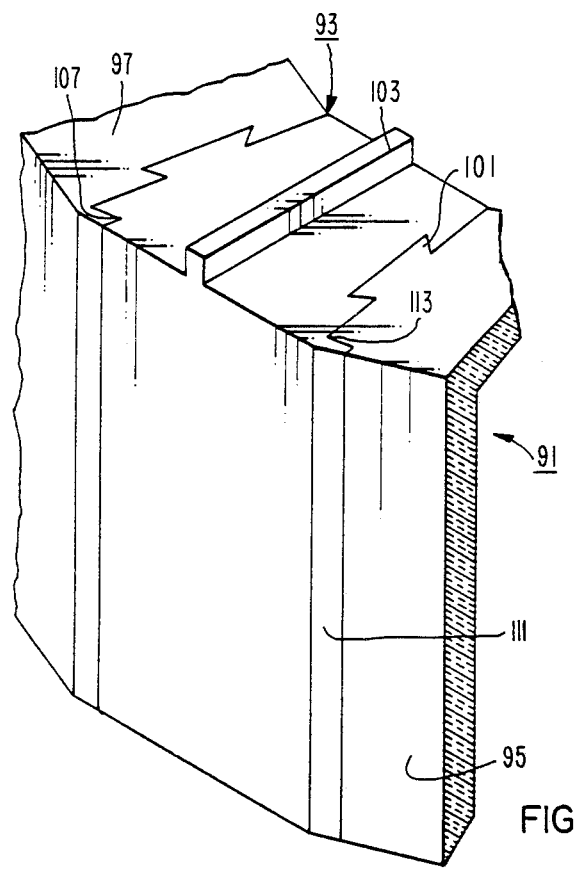
FIG. 9 is a fragmental view in isometric showing a plurality of thermal shielding units, in accordance with a modification of this invention, interlocked.
Figure 10:
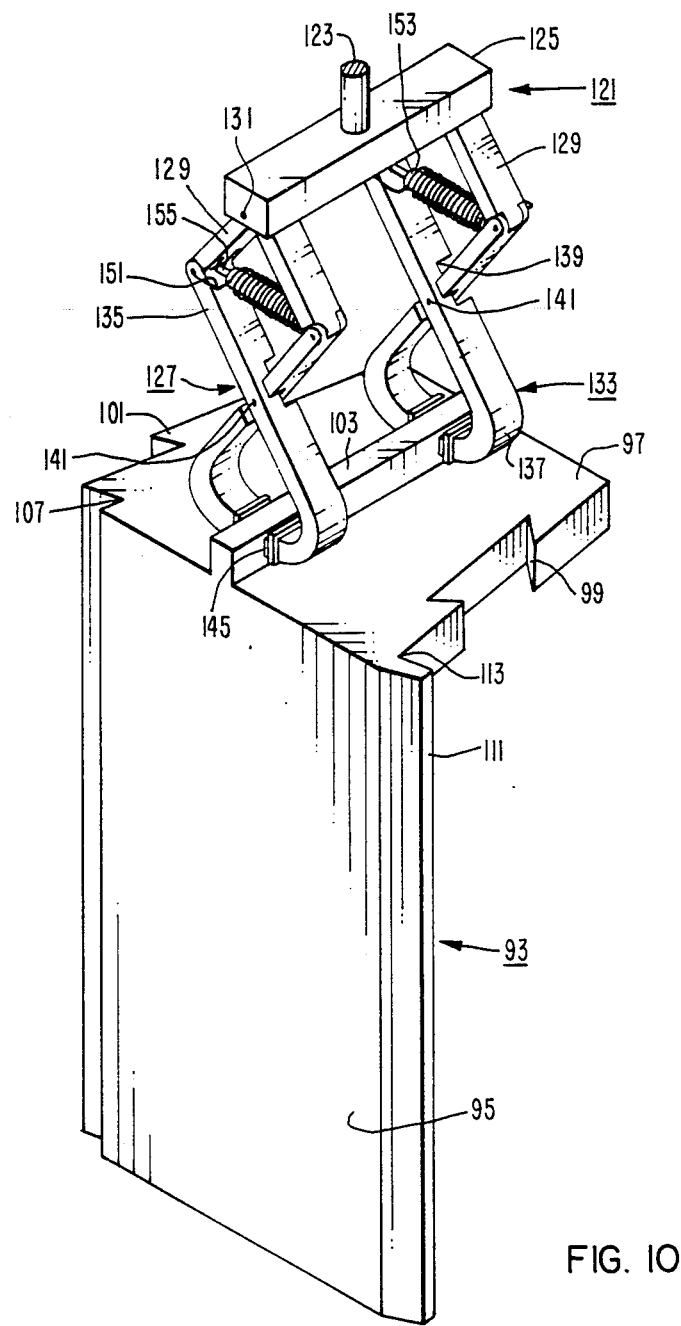
FIG. 10 is a fragmental view in isometric showing a lifting tool in accordance with a modification of this invention interlocking with the lifting-and-lowering bar of the modification shown in FIG. 8.

FIGS. 9 and 10 show a thermal shield 91 for the head 15 which also includes a plurality of shielding units 93. Each unit 93 includes a vertical member 95 and a horizontal member 97. One edge of the horizontal member 97 is shaped to contain the female component 99 of a dovetail and the opposite edge is shaped to have the male component 101 of the dovetail. A lifting-and-lowering bar 103 extends integrally from the center of the top of the horizontal member 97. The vertical member 95 is offset horizontally with resect to the vertical member 97 so that an external right-angle groove 107 extends from the horizontal member on the side of the male dovetail 101 and a lip 111 forming an internal short right-angle groove 113, with the edge of the horizontal member 97, extends on the side of the female component 99 of the dovetail. The outer surface of the vertical member is beveled towards component 99 along the lip 111.

A tool 121 (FIG. 10) is provided for raising or lowering the shielding units 93. This tool 121 includes a long handle 123 which is manipulated by a crane (not shown) on the seismic platform or on the platform above the well where the reactor 11 is installed. A cross-bar 125 is centrally secured to the handle 123. Scissor-like clamps 127 are pivotally suspended from the cross-bar 103. Each clamp 127 includes a pair of levers 129 pivotal together about a pin 131 extending into the cross-bar 125. Each lever 129 is pivotally joined to a jaw member 133 of the clamps 127. Each jaw member 133 has an arm 135 in which a jaw 137 is integrally connected. The arms 135 engage each other in grooves 139 where they are pivotal relative to each other about a pin 141. The pin 141 joins the lever and the arm 135 of the jaw member. Each jaw 137 has a friction pad 145 along its clamping surface.

Each clamp 127 is actuable to engage and disengage the lifting-and-lowering bar 103 by a mechanism including a spring 151 and a solenoid 153. The solenoid 153 is connected in an energizing circuit (not shown) to a power supply on the platform. The spring 151 is connected to the opposite pivoting pins 131 of the joints of each lever 129 and each arm 135 of each clamp 133 urging these joints inwardly so that the clamp is tightly engaged with the sides of bar 103. The plunger 155 of the solenoid 153 is connected at one end to a joint of lever 129 and arm 135. The other end of the solenoid is connected to the opposite joint. When the solenoid 153 is energized, the force of the spring 151 is counteracted and the joints of the levers 129 and arms 135 are moved outwardly disengaging the jaws from the bar 103.

When the shield 91 is to be placed over the head 15, the tool 121 is manipulated remotely so that its clamps 133 engage the bar 103 of each shielding unit 93 in its turn. The first shielding unit 93 is positioned over the head 15. Then the second unit is positioned, the surfaces of its groove 107 sliding along the surface of short groove 113 and the inner surface of lip 111 and its male component 101 engaging the female component 99 of the first unit 91. Thereafter the other units 93 are positioned over the head, each in its turn. The outer surfaces of the horizontal members 97 are flush as shown in FIG. 9.

While preferred embodiments of this invention have been disclosed herein, many modifications thereof are feasible. For example, any number of shielding units 23 shown as 16 in FIG. 1 could be as low as 6 or lower or greater than 16. This invention is not to be limited except insofar as is necessitated by the spirit of the prior art.

We claim:

1. A nuclear reactor including a vessel having a body and a head, a thermal insulating shield for said head, said shield including a plurality of removable, one-piece shielding units of thermal insulating material, each said unit being of generally inverted L longitudinal cross section and including a generally vertical member and a generally horizontal member rigidly joined to said vertical member, means, on each shielding unit, cooperative with units adjacent to said each unit in said thermal insulating shield, for interlocking said each unit with its said adjacent units, said interlocking means being structured to permit separation of said each unit from interlock with its said adjacent units by displacement of said each unit relative to its said adjacent units, said units, when each unit is interlocked with its said adjacent units forming an effective thermal insulating shield for said head with said generally vertical members extending along said head laterally and said generally horizontal members extending over at least a portion of said head and means, on said each unit, remotely operable, to interlock said each unit with its said adjacent units or, when said each unit and its said adjacent units are interlocked, to displace said each unit relative to its said adjacent units to separate said each unit from interlock with its said adjacent units.

2. The nuclear reactor of claim 1 including means on the generally horizontal member of each shielding unit to be engaged by the remotely actuable means for moving said each said unit generally vertically upwardly or generally vertically downwardly.

3. The nuclear reactor of claim 1 wherein the engageable and disengageable means on the edges of each shielding unit and its adjacent units, includes surfaces so formed that when said each unit is moved downwardly or upwardly generally vertically relative to its adjacent units, the surface of each said unit slides along and are guided by the surfaces of the said adjacent units into interlocked or separated relationship.

4. The nuclear reactor of claim 3 wherein the surfaces of each unit and of the units adjacent to said each said unit which slide and are guided along each other extend along the edges of the generally vertical members of the interlocked shielding units.

5. The nuclear reactor of claim 1 wherein the cooperative means on each unit and its adjacent unit are cooperative dovetail components formed along the edges of each unit and its adjacent units so that each unit is interlocked with its adjacent units by dovetails.

6. The nuclear reactor of claim 1 wherein the cooperative means includes pin means on one edge of each unit and slot means on the opposite edge of said each unit, a pin means of said each unit engaging a slot means of a unit adjacent to said each unit on one side of said each unit and a slot means of said each unit being engaged by the pin means of a unit adjacent to said each unit on the opposite side of said each unit.

7. The nuclear reactor of claim 1 wherein the shield is composed of a neutron reflecting material.

8. A nuclear reactor including a vessel having a body and a head, a thermal insulating shield for said head, said shield including a plurality of removable, one-piece, shielding units of thermal insulating material, each said unit being of generally inverted L longitudinal cross section and including a generally vertical member and a generally horizontal member rigidly joined to said vertical member, means, on the edges of each said unit, engageable with, or disengageable from, cooperative means on the edges of units adjacent to said each unit, for interlocking said each unit with, or separating said each unit from, its said adjacent units by generally vertical movement downwardly or upwardly respectively of said each unit relative its said adjacent units, and remotely actuable means, cooperative with said each unit, for moving said each unit generally vertically downwardly or vertically upwardly separately from its said adjacent units for interlocking said each unit with, or separating said each unit from its said adjacent units.

9. The nuclear reactor of claim 6 wherein the pin means and the slot means are in the horizontal member of each shielding unit.

10. The nuclear reactor of claim 1 wherein the generally vertical member of each unit includes grooves along the edge of its generally vertical member and the units adjacent to said each unit also include grooves along the edges of their generally vertical members, the grooves of the edges of the generally vertical member of said each unit sliding along the grooves of the generally vertical members of said adjacent units when said each unit is moved vertically downwardly to interlock with said adjacent units or vertically upwardly to separate said each unit from its adjacent members.

11. The nuclear reactor of claim 1 wherein the thermal insulating units are formed to be interlocked in a predetermined sequence and to be separated in the reverse sequence, said units including:
   (a) a first unit in the sequence to be positioned over the head first and separated last,
   (b) intermediate units to be positioned over the head one at a time in the sub-sequence, second third-,—(n−1)st, nth, said nth unit being the last intermediate units in the sub-sequence to be interlocked, said intermediate units to be separated in the sub-sequence n, (n−1)—third and second, and
   (c) a last unit to be interlocked last in the sequence and to be separated first in the sequence, the interlocking means of said first and last units being formed differently than the interlocking means of the intermediate units to permit interlocking and separation of said units in said sequence.

12. The reactor of claim 11 wherein each thermal insulating shielding unit includes a pin at one end and a slot at the opposite end, each said unit being interlocked with its adjacent units by the engagement of its pin on one side in the slot of the adjacent unit on said one side and by the engagement of the pin of the said adjacent unit on the opposite side in the slot of said each unit on said opposite side, the pin and its corresponding engageable slot of the first and last unit being formed to engage and separate oppositely to the pins and their corresponding engageable slots of the intermediate units, to permit interlocking of all said shielding units in the sequence.

13. A nuclear reactor including a vessel having a body and a head, a shield for said head, said shield including a plurality of removable one-piece shielding units of shielding material, each said unit including a generally vertical member and a generally horizontal member rigidly joined to said generally vertical member, means, on each shielding unit, cooperative with shielding units adjacent to said each shielding unit, for interlocking said each shielding unit with its said adjacent shielding units, said interlocking means being structured to permit separation of said each unit from interlock with its said adjacent units by displacement of said each unit from its said adjacent units, said each unit when interlocked with its said adjacent units forming an effective shield for said head with said generally vertical members extending along said head laterally and said generally horizontal members extending at least over a portion of said head, and means, on said each unit, remotely operable, to interlock said each unit with its said adjacent units or, when said unit and its said adjacent units are interlocked, to displace said each unit relative to its said adjacent units to separate said each unit from its said adjacent units.

14. The nuclear reactor of claim 13 wherein the generally horizontal member of each unit includes means for interlocking said each unit with its adjacent units and the generally vertical member of said each unit includes means for guiding said each unit along its said adjacent units into interlock with its said adjacent units or in the displacement of said each unit relative to its said adjacent units.

* * * * *